United States Patent
Maziel et al.

(10) Patent No.: US 11,969,849 B2
(45) Date of Patent: Apr. 30, 2024

(54) METHOD OF POLISHING A SURFACE OF A WAVEGUIDE

(71) Applicant: Lumus Ltd., Ness Ziona (IL)

(72) Inventors: Amit Maziel, Rehovot (IL); Naamah Levin, Rehovot (IL); Lilya Lobachinsky, Tel Aviv (IL); Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/138,081

(22) Filed: Apr. 23, 2023

(65) Prior Publication Data

US 2023/0256558 A1    Aug. 17, 2023

Related U.S. Application Data

(63) Continuation of application No. 17/762,144, filed as application No. PCT/IL2020/051189 on Nov. 17, 2020, now Pat. No. 11,667,004.

(Continued)

(51) Int. Cl.
*B24B 13/015* (2006.01)
*B24B 13/005* (2006.01)
(Continued)

(52) U.S. Cl.
CPC .......... *B24B 13/015* (2013.01); *B24B 13/005* (2013.01); *B24B 49/12* (2013.01); *G01B 11/27* (2013.01)

(58) Field of Classification Search
CPC ... B24B 37/048; B24B 47/225; B24B 19/226; B24B 19/22; B24B 13/0018; B24B 13/005; B24B 13/015; B24B 49/12; G01B 11/27
See application file for complete search history.

(56) References Cited

U.S. PATENT DOCUMENTS

| | | | | |
|---|---|---|---|---|
| 5,130,523 A | * | 7/1992 | Raleigh | G01B 11/005 |
| | | | | 250/202 |
| 5,131,745 A | * | 7/1992 | Whitney | G02B 6/4203 |
| | | | | 356/73.1 |

(Continued)

FOREIGN PATENT DOCUMENTS

| | | | | |
|---|---|---|---|---|
| JP | 3932207 B2 | * | 6/2007 | H01S 3/0315 |
| KR | 101095920 B1 | * | 12/2011 | B23K 26/21 |

(Continued)

*Primary Examiner* — Joel D Crandall
(74) *Attorney, Agent, or Firm* — Rivka Friedman

(57) ABSTRACT

A method of polishing a target surface of a waveguide to achieve perpendicularity relative to a reference surface is disclosed. The method includes i) providing a polishing apparatus having a polishing plate with a flat surface defining a reference plane, and an adjustable mounting apparatus configured to hold the waveguide during polishing at a plurality of angular orientations; ii) positioning an optical alignment sensor and a light reflecting apparatus such that a first collimated light beam is reflected off of a surface parallel to the reference plane, and a second perpendicular collimated light beam is reflected off of the reference surface; iii) aligning the waveguide within the polishing apparatus such that the reflections received by the optical alignment sensor align within the optical alignment sensor, thereby being indicative of perpendicularity between the reference plane and the reference surface; and iv) polishing the target surface of the aligned waveguide.

21 Claims, 7 Drawing Sheets

Related U.S. Application Data

(60) Provisional application No. 62/939,708, filed on Nov. 25, 2019.

(51) Int. Cl.
 *B24B 49/12* (2006.01)
 *G01B 11/27* (2006.01)

(56) References Cited

U.S. PATENT DOCUMENTS

| | | | |
|---|---|---|---|
| 5,640,475 A * | 6/1997 | Takahashi | B24B 19/226 |
| | | | 451/271 |
| 8,432,614 B2 | 4/2013 | Amitai | |
| 10,133,070 B2 | 11/2018 | Danziger | |
| 2007/0091445 A1 | 4/2007 | Amitai | |
| 2016/0116739 A1 | 4/2016 | Tekolste et al. | |
| 2018/0210202 A1 | 7/2018 | Danziger | |
| 2019/0064518 A1 | 2/2019 | Danziger | |
| 2021/0033774 A1 | 2/2021 | Tanaka | |

FOREIGN PATENT DOCUMENTS

| | | | | |
|---|---|---|---|---|
| WO | WO-0149454 A1 * | 7/2001 | | B24B 37/048 |
| WO | WO-0196068 A1 * | 12/2001 | | B24B 37/013 |

* cited by examiner

METHOD OF POLISHING A SURFACE OF A WAVEGUIDE

TECHNICAL FIELD

The presently disclosed subject matter relates to waveguides, and, more particularly, to methods of polishing a surface of a waveguide.

BACKGROUND

Certain head-mounted displays (HMD) employ a two-dimensional waveguide that operates by trapping light waves inside a substrate by total internal reflections from the external surfaces of the waveguide. The light waves which are trapped inside the waveguide are coupled out by an array of partially reflecting surfaces. Typically, the coupled out light waves pass through an additional waveguide before being transmitted to the eye of a user. In order to maintain the quality of the propagating image, there must be a very high degree of perpendicularity between two or more surfaces of the waveguide. Typically these waveguides have two pairs of parallel external surfaces opposite each other (i.e. top and bottom, front and back) in which the two pairs have to be mutually perpendicular.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1:
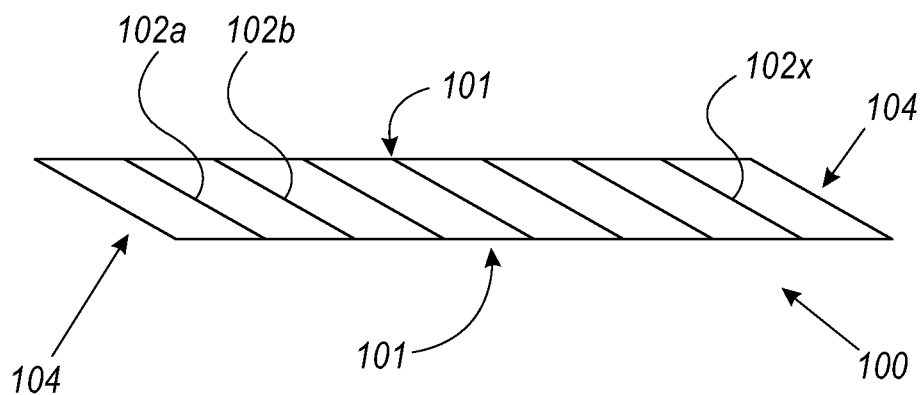
FIG. 1 illustrates a top view of a waveguide in accordance with certain embodiments of the presently disclosed subject matter.
Figure 2:
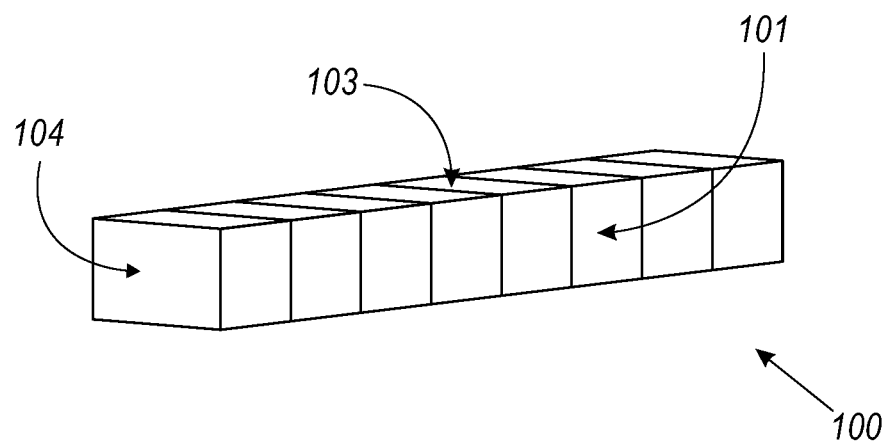
FIG. 2 illustrates a perspective view of a waveguide in accordance with certain embodiments of the presently disclosed subject matter.

Bearing this in mind, the presently disclosed subject matter is particularly applicable to a waveguide such as that disclosed in PCT publication no. WO 2018/065975 A1, which comprises a plurality of internal partially reflecting surfaces which are parallel to each other but angled relative to waveguide's side external surfaces, although the invention may also be applied to advantage in any case where optical components must be polished to generate high-quality mutually-perpendicular polished surfaces, even without internal partially-reflective surfaces. Referring now to FIG. 1, there is illustrated a top view of a waveguide 100 having side external surfaces 101, front and back surfaces 104, and angled internal surfaces 102a-102x. FIG. 2 illustrates a perspective view of waveguide 100 in which is shown a side surface 101, top surface 103, and front surface 104. In waveguides such as the one disclosed in the aforementioned PCT, there must be a very high degree of perpendicularity between the top and bottom surfaces relative to the side external surfaces, and in certain preferred implementations also between the top and bottom surfaces relative to the internal surfaces.

As such, there is herein provided a method of polishing an external surface of a waveguide in order to achieve accurate perpendicularity between the surface to be polished ("target surface") and at least one other, typically abutting, surface ("reference surface") of the waveguide. In some embodiments it may be desirable for the target surface to be polished accurately perpendicular to two different non-parallel reference surfaces simultaneously, such as an external surface and an internal surface.

Figure 3:
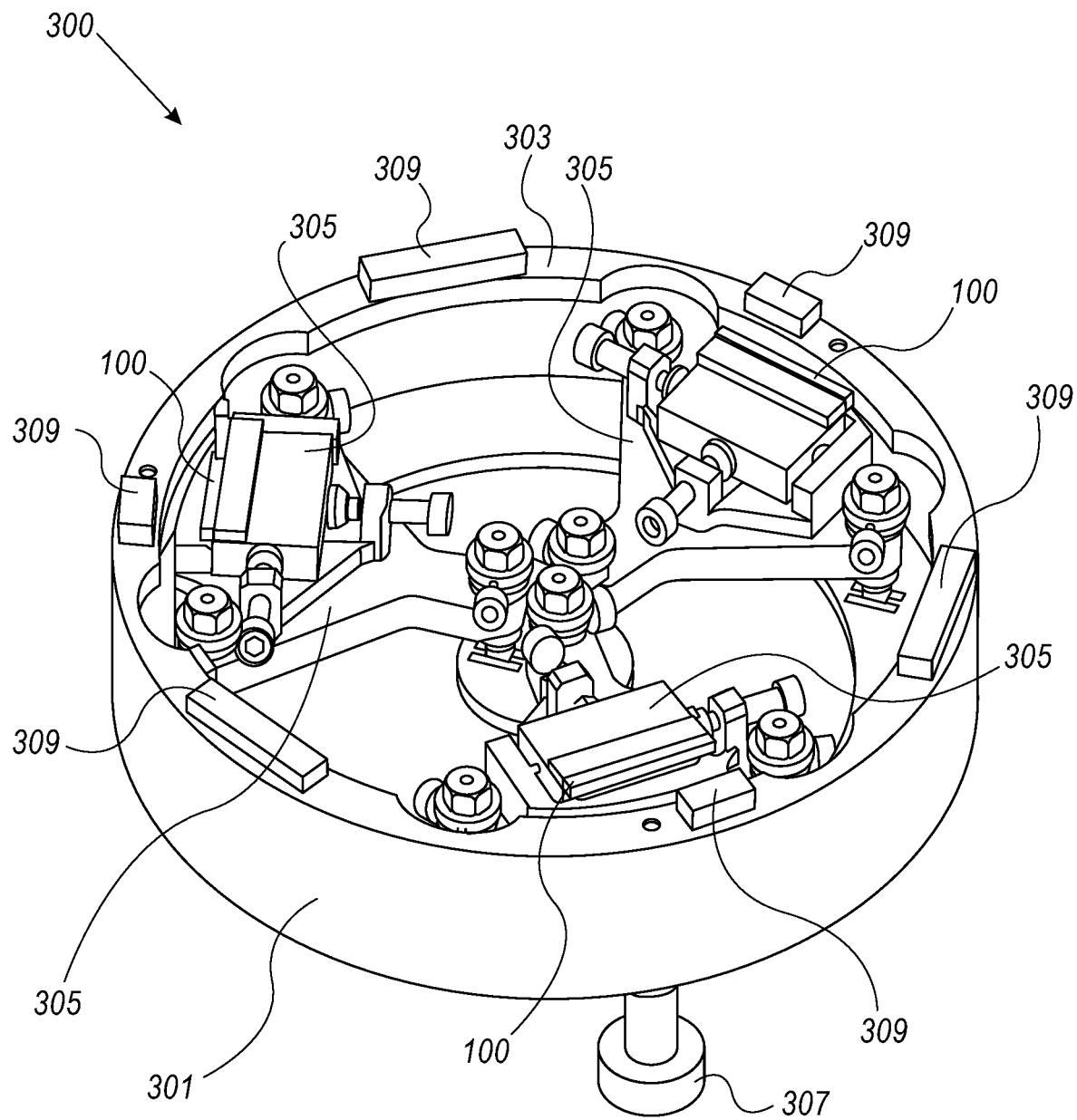
FIG. 3 illustrates a schematic isometric view of a polishing apparatus in accordance with certain embodiments of the presently disclosed subject matter.

Referring now to FIG. 3, the method includes providing a polishing apparatus 300 for use in polishing a target surface of the waveguide. The polishing apparatus 300 includes an annular polishing plate 301 having a flat exterior (top as shown) surface 303. Polishing plate 301 is configured to hold an object to be polished and facilitate slidable contact between the object to be polished and a polisher (not shown), such that point of contact between the polisher and the object defines a polishing plane (which generally moves during polishing as the object's surface is ground down). During polishing, polishing apparatus 300 contacts the polisher such that flat surface 303 is parallel to the polishing plane. Therefore it can be said that flat surface 303 defines a plane (hereinafter "reference plane") which is always parallel to the polishing plane. Although FIG. 3 shows polishing apparatus 300 with flat surface 303 facing upwards, this is for clarity only, as in most cases during polishing the polishing apparatus 300 is turned upside down onto the polisher.

Polishing apparatus 300 further includes at least one adjustable mounting apparatus 305 configured to hold the waveguide 100 during polishing of the target surface. Adjustable mounting apparatus 305 is further configured to hold the waveguide at any one of a plurality of angular orientations relative to the flat surface 303 of the polishing apparatus 300. As will be further detailed with reference to FIG. 4, the adjustable mounting apparatus 305 facilitates rotation of the waveguide 100 about a plurality of axes, thereby allowing a user to set the desired plane upon which the target surface will be polished to (i.e. made parallel to after polishing is complete).

In some embodiments, as shown in FIG. 3, polishing apparatus 300 can include a plurality of adjustable mounting apparatuses 305, where each mounting apparatus 305 holds a different waveguide 100 and each mounting apparatus 305 is independently adjustable, thereby allowing simultaneous polishing of a plurality of waveguides 100. In some embodiments, polishing apparatus 300 further includes a rotatable base 307 which allows for bringing each mounting apparatus sequentially into alignment with the optical alignment sensor, as will be detailed below. Free rotation may also be allowed during polishing.

In some embodiments, the method further includes mounting a plurality of sacrificial blocks 309 (e.g. using an adhesive bonding material) on flat surface 303 of polishing plate 301 at various points. Sacrificial blocks 309 may be desired in some cases for balancing and/or load distribution during polishing. In addition or in the alternative, sacrificial blocks 309 may also be desired to relieve some of the pressure placed on the waveguide(s) 100 during polishing. This is particularly valuable where the polishing process would initially reach a corner or edge of the waveguide, which would otherwise result in a localized application of excessive loading of the polisher. By use of sacrificial blocks 309, the load of the polishing process is always distributed over a relatively large area, maintaining parallelism of the polisher to the reference plane and avoiding damage to corners or edges of the waveguide. In this case, prior to polishing, target surface of waveguide 100 should be adjacent to, but below, the top surface of sacrificial blocks 309. By "adjacent, but below", it is meant that to the naked eye the two surfaces appear to lie on the same plane but in fact there is a miniscule difference in their relative elevation such that the target surface is somewhat lower. Additionally or alternatively, top surface of sacrificial blocks 309 can be used as an alternative reference plane parallel to the polishing plane, as will be detailed below. In some cases, by employing sacrificial blocks pre-polished to provide two parallel faces and uniform thickness, a sufficiently accurate reference surface can be achieved by adhering the blocks to flat surface 303 with pressure. Additionally, or alternatively, the plurality of sacrificial blocks 309 may first be simultaneously polished after mounting in order to ensure that the top surfaces thereof lie on identical planes, i.e. are coplanar, and secondly that the top surfaces of the sacrificial blocks are accurately parallel to the polishing plane. In some embodiments, the sacrificial blocks 309 can be made out of glass, or out of the same material as waveguide 100, or any other suitable material.

Figure 4:
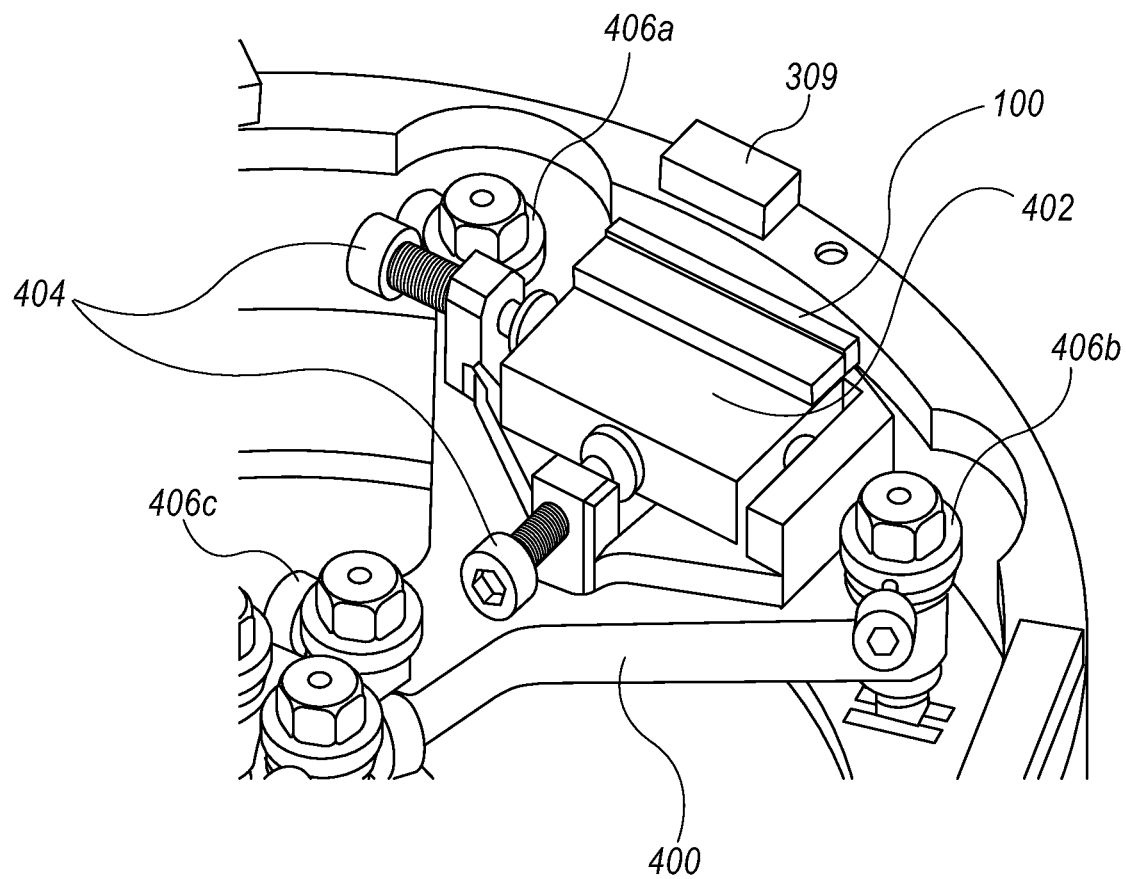
FIG. 4 illustrates an enlarged view of a region of FIG. 3 showing an adjustable mounting apparatus in accordance with certain embodiments of the presently disclosed subject matter.

FIG. 4 illustrates an enlarged view of adjustable mounting apparatus 305 according to some embodiments of the presently disclosed subject matter. Mounting apparatus 305 includes a tilting stage 400 on which is fixed a mounting plate 402 configured to receive the waveguide and to hold the waveguide during polishing, for example via a temporary adhesive bond, or alternatively by clamping. Mounting plate 402 is secured to tilting stage 400 by clamps which are tightened by fasteners 404 (e.g. screws). Mounting apparatus 305 further comprises rotation screws 406a-406b configured to facilitate rotation (tilting) of tilting stage 400 about at least two perpendicular axes (e.g. tilt and roll). In certain embodiments, mounting apparatus can include a third "elevation" screw 406c to facilitate adjusting the height (i.e. elevation) of tilting stage 400 relative to polishing plate 301. In the preferred but non-limiting implementation illustrated here, all three adjustment screws 406a-406c are essentially similar, each raising or lowering one region of a three-point support structure. However, the presence of three adjustment points allows for overall raising or lowering of the tilting stage 400. In certain embodiments it may be desirable to set the height of the waveguide such that at least part of the target surface is located below, but adjacent to, an initial polishing plane (e.g. top surface of sacrificial blocks 309). In certain embodiments, the height of the waveguide can be adjusted, via operation of screws 406a-406c, to a predetermined difference relative to the initial polishing plane such that sacrificial blocks 309 take all, or most of the load during the initial stage of polishing.

During polishing, substantial stress can be placed on tilting stage 400, which could lead to unintended slippage of adjustment screws 406a-406c, and consequent undesirable deviation in the orientation of the tilting stage 400. To prevent such deviation, in some embodiments, mounting apparatus 305 can further include a locking mechanism configured to lock the orientation of tilting stage 400 at a given angular orientation (and height). In this case, the method preferably further includes locking the angular orientation and/or height of the tilting stage by use of the locking mechanism prior to polishing.

Figure 5:
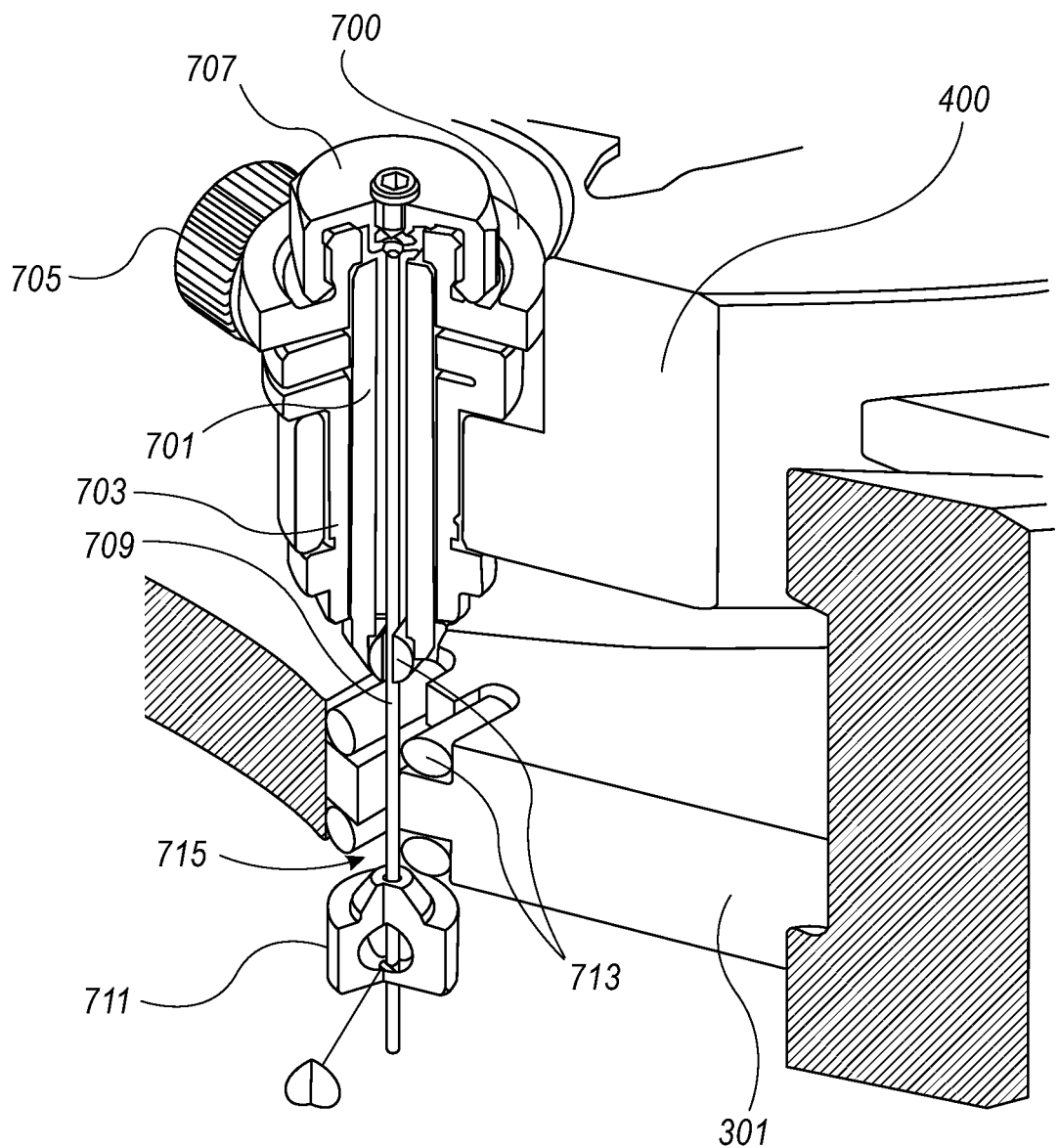
FIG. 5 illustrates a schematic partially cut-away isometric view of a locking mechanism in accordance with certain embodiments of the presently disclosed subject matter.

FIG. 5 illustrates a schematic non-limiting example of a locking mechanism according to certain embodiments of the presently disclosed subject matter, serving also as a more detailed exemplary structure of each of the aforementioned adjustment screws 406a-406c. Adjustment of the height of the region of tilting stage 400 supported by each adjustment screw is achieved by turning wheel 700 which turns a hollow bolt 701, which in turn raises or lowers a rider 703 engaged with a region of the tilting stage 400. When the adjustment screw is correctly adjusted, wheel 700 is fixed to prevent further turning by tightening a screw 705 which locks wheel 700. An additional clamping screw 707 is connected via a cable 709 to a cable end 711, located on the opposite side of a support member of polishing plate 301. Once all adjustments to orientation have been finalized, screw 707 is rotated to tighten cable 709, thereby securing the tilting stage 400 to the polishing plate 301 at the given orientation. In some embodiments, the locking mechanism can further include metallic ends 713 to prevent tilting stage 400 from sinking relative to polishing plate 301 during tensioning of cable 709. In some embodiments, the locking mechanism can further include a spring 715 located between cable end 711 and polishing plate 301 to maintain residual tension of the cable 709 when screw 707 is loosened, e.g. to make adjustments to the orientation of tilting stage 400.

Figure 6:
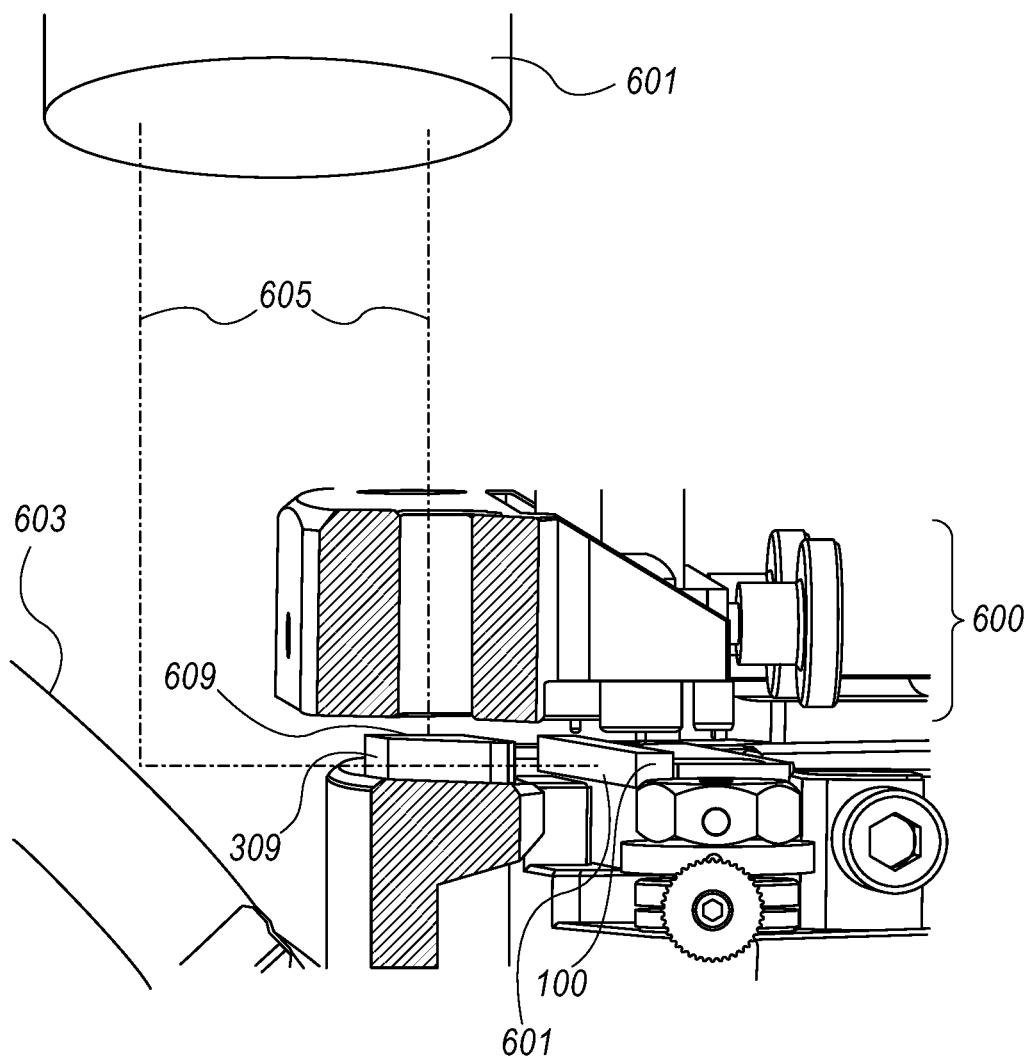
FIG. 6 illustrates a schematic view illustrating a process of aligning a waveguide in accordance with certain embodiments of the presently disclosed subject matter.

Referring now to FIG. 6, in some preferred embodiments, the method further includes positioning a height sensing apparatus 600 configured to detect the height difference between the target surface of waveguide 100 and the top surface 609 of sacrificial blocks 309, and to set the desired height difference prior to polishing. In some embodiments, a height sensing apparatus 600 can also be used, after adjusting the first waveguide to the desired height, to adjust the height of the second and subsequent waveguides in polishing apparatus 100 to the same height as the first waveguide.

In some embodiments, as illustrated in FIG. 6, the method further includes positioning one or more optical alignment sensors 601 (e.g. an autocollimator, etc.), each configured to emit one or more collimated light beams and to receive reflections thereof, and positioning one or more light reflecting apparatuses 603 (e.g. mirror, pentaprism, etc.) configured to reflect a collimated light beam exactly 90 degrees. For each reference surface 607 a corresponding optical alignment sensor 601 and corresponding light reflecting apparatus 603 is positioned such that a first collimated light beam is reflected off of a surface 609 parallel to the reference plane, and a second collimated light beam 605, perpendicular to the first collimated light beam at the reflection point, is reflected off of the given reference surface 607. Suitable optical alignment sensors include the Nikon Autocollimator 6B-LED/6D-LED made by Nikon Corporation. It should be appreciated that a single, broad collimated light beam can also be used, in which case the reference to a first and second collimated light beams should be understood to refer to two different parts of a single collimated light beam.

In some embodiments the method further includes, by use of the adjustable mounting apparatus 305, aligning waveguide 100 within polishing apparatus 300 such that the polishing plane is perpendicular to each reference surface. This is accomplished by adjusting the angular orientation of the waveguide such that for each given reference surface, the reflections received by the corresponding optical alignment sensor 601 align therein, thereby being indicative of perpendicularity between the reference plane (and by extension the polishing plane) and the given reference surface, as will be further detailed below with reference to FIG. 7.

The method further includes polishing the target surface of the waveguide by bringing it into slidable contact with the polisher, thereby achieving accurate perpendicular polishing of the target surface relative to each reference surface. In some embodiments, accurate perpendicularity includes perpendicularity to within 1 arcminute. In some embodiments, accurate perpendicularity includes perpendicularity to within 10 arcseconds.

In some embodiments, as detailed above, the method can include locking the orientation of the waveguide via the locking mechanism of the mounting apparatus prior to polishing.

Figure 7:
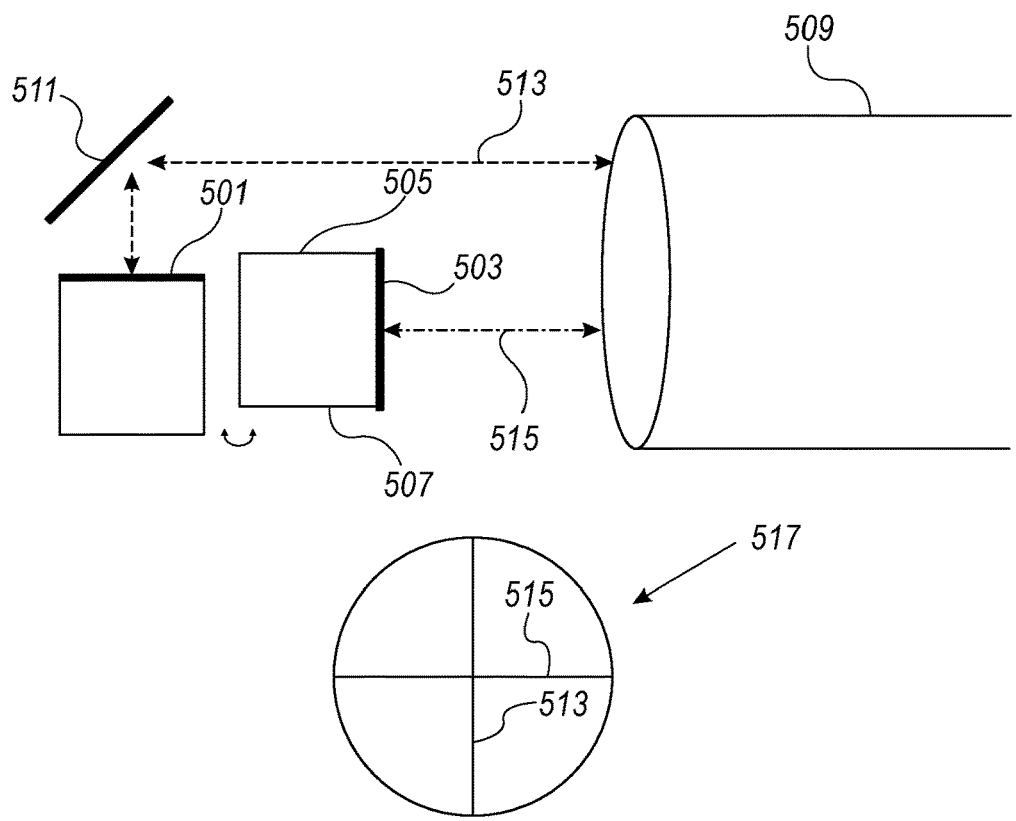
FIG. 7 illustrates a conceptualized schematic of aligning two surfaces in accordance with certain embodiments of the presently disclosed subject matter.

For greater clarity reference is made to FIG. 7, illustrating a conceptual diagram of the alignment method detailed above. Cube 507 has two abutting non-parallel surfaces 505 and 503. Surface 505 is desired to be polished accurately perpendicular to surface 503. Surface 501 is known in advance to be parallel with the polishing plane, therefore the desired outcome is to orient cube 507 on the polishing apparatus such that surface 503 is accurately perpendicular to surface 501. An autocollimator 509 and forty-five degree tilted mirror 511 are together positioned such that autocollimator 509 emits a first collimated beam 513 onto surface 501 and a second collimated light beam 515 (which may be a different region of a single broad collimated beam) onto surface 503, and receives reflections therefrom. If the reflections from the two collimated light beams are precisely parallel so that their images appear aligned within the autocollimator, surface 503 is perpendicular to the polishing plane, and otherwise not. In such a case, cube 507 should be rotated left or right until the collimated light beams align.

As illustrated in FIG. 7, the reflections of two collimated beams received within an autocollimator can be considered aligned when, as viewed in a viewfinder 517 of the autocollimator, alignment symbols in the received reflections 513, 515 coincide. Imperfectly overlapping reflections are considered misaligned and indicative of non-perpendicularity between the surfaces off of which the collimated light beams were reflected.

Figure 8:
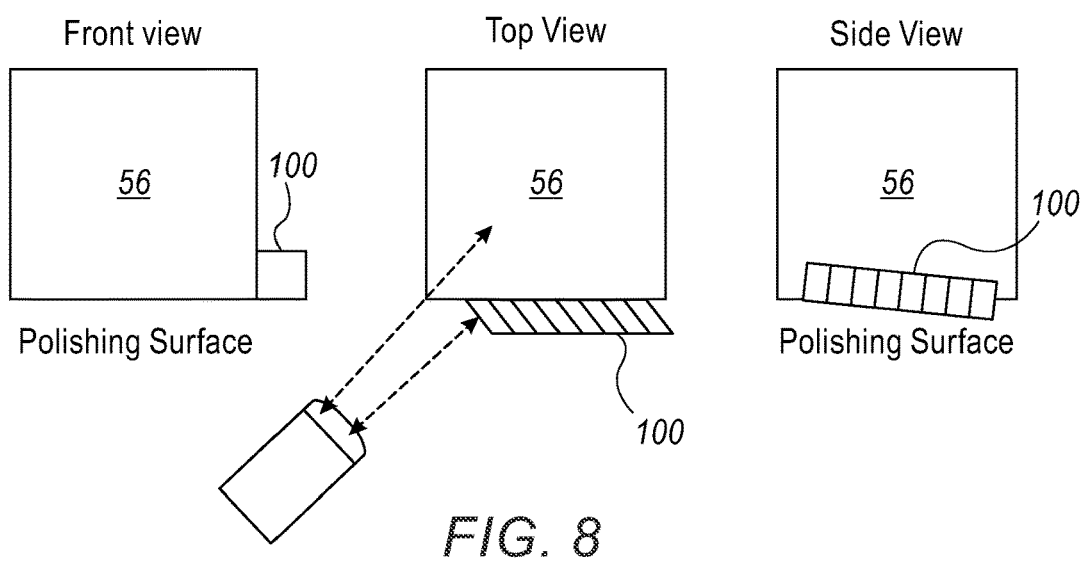
FIG. 8 illustrates an alternative method of aligning a waveguide in accordance with certain embodiments of the presently disclosed subject matter.

FIG. 8 illustrates an alternative method of aligning the waveguide. In this method, the waveguide is bonded to a large, preferably glass, block 56 having accurately perpendicular surfaces, with the target surface of the waveguide facing the polisher. The surface of block 56 to which the waveguide is bonded to is perpendicular to the polishing plane and therefore the target surface will be made perpendicular to it after polishing. If the target surface is simultaneously to be made perpendicular with an internal surface of the waveguide, an optical alignment sensor and light reflecting apparatus can be used to reflect a first collimated light beam off of the internal surface of the waveguide and a second collimated light beam off of a top surface of block 56. The waveguide's orientation relative to block 56 is then adjusted until the reflected beams overlap.

Figure 9A:
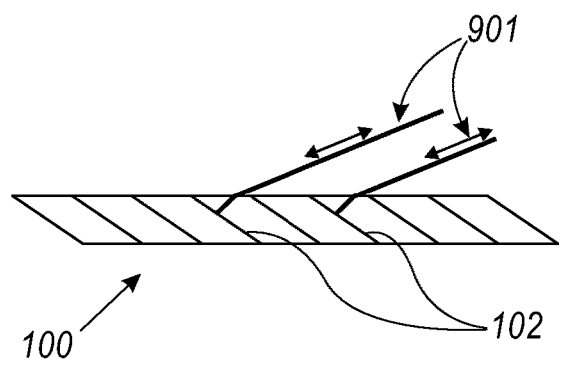
FIG. 9 illustrates an alternative top view of aligning a waveguide in accordance with certain embodiments of the presently disclosed subject matter.

FIG. 9A illustrates an alternative, or additional, alignment method whereby a ray 901 is reflected from internal facets 102. The rays 901 (preferably originated and reflected onto an autocollimator) have a different angle within the waveguide 100 from outside the component because of refraction by the component 100. Nevertheless, the alignment procedure is still effective as previously described.

Figure 9B:
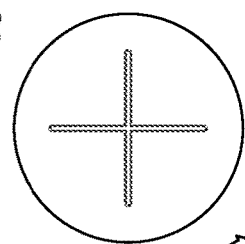
Figure 9C:
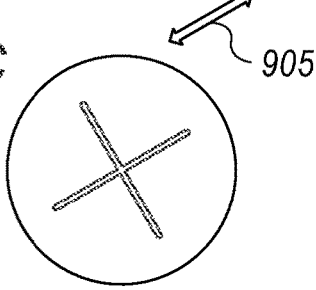
Figure 9D:
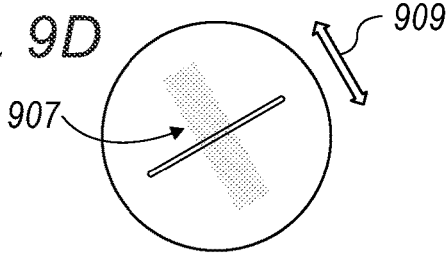

In certain cases, the light from the autocollimator is not monochromatic. Consequently, the reflected light will be dispersed by the aforementioned refraction, thereby degrading alignment accuracy. According to this invention, this limitation can be eliminated by using proper orientation of the autocollimator projected image. FIG. 9B shows a typical image projected by the autocollimator. If the dispersion orientation of ray 901 on the image plan is expected to be at orientation illustrated by arrow 905, the orientation of the collimator projected image should be adjusted (rotated) until it is aligned in parallel and perpendicular to the dispersion orientation, as shown in FIG. 9C. The reflected image (FIG. 9D) illustrates the resultant dispersion of the vertical line 907 so that, in most cases, it is rendered invisible. The line aligned along the direction of dispersion remains sharp. Shift of this line in perpendicular direction 909 relative to the projected reflected image from surface 609 indicates non-perpendicularity, as previously described.

Figure 10:
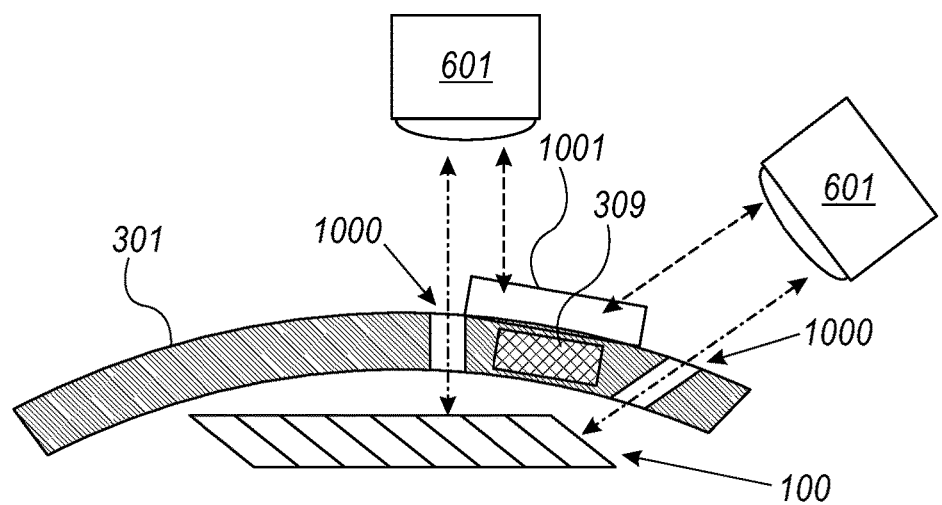
FIG. 10 illustrates a bottom view of a polishing apparatus with openings for aligning a waveguide in accordance with certain embodiments of the presently disclosed subject matter.

Referring now to FIG. 10, in some embodiments, it may be desirable to re-check the perpendicularity between the polishing plane and the reference surface(s) at various times throughout the polishing process. In order to facilitate such checking without separating the polishing apparatus from the polisher, in some embodiments one or more openings 1000 can be made, e.g. by drilling, through the polishing plate, each opening allowing a collimated light beam to reach its intended surface. Additionally, since the sacrificial blocks are in contact with the polisher and not accessible by the optical alignment sensor, a substitute surface parallel to the polishing plane may be used. In this case, one or more blocks 1001, each having a flat surface parallel to the polishing plane can be attached to the polishing plate and used as the reference plane in place of the sacrificial blocks.

In certain particularly preferred implementations of the device and method of the present invention, alignment of the polishing plane perpendicular to a surface of the waveguide is performed simultaneously for both an external surface and an internal partially reflective surface of the waveguide. The adjustment may be performed using two autocollimators simultaneously and performing the adjustment of each alternately and iteratively. In some cases, the adjustment process may be automated.

For greater clarity, in waveguide applications where a top or and/or bottom surface is required to be accurately perpendicular to the side external surfaces and the angled internal surfaces, two optical alignment sensors and two light reflecting apparatuses can be used to achieve accurate perpendicularity between the target surface and two non-parallel reference surfaces (i.e. a side external surface and an internal surface). The first optical alignment sensor and light reflecting apparatus emit and receive reflections from a surface parallel to the polishing plane and the first reference surface, respectively. The second optical alignment sensor and light reflecting apparatus emit and received reflections from the surface parallel to the polishing plane and the second reference surface, respectively. The angular orientation of the waveguide is then adjusted using the adjustable mounting apparatus until the reflections received by the first optical alignment sensor align therein and the reflections received by the second optical alignment sensor also align therein, thereby indicating perpendicularity between the polishing plane, first reference surface, and second reference surface simultaneously.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. An adjustable mounting apparatus comprising:
   a titling stage;
   a waveguide mounting plate in communication with the tilting stage configured to receive a waveguide; and
   a tilting arrangement configured to communicate with a plate having a planar exterior surface, the tilting arrangement including:
      a first rotation mechanism associated with a first region of the tilting stage, and
      a second rotation mechanism associated with a second region of the tilting stage,
      the rotation mechanisms cooperating to rotate the tilting stage about at least two perpendicular axes so as to position a waveguide, received by the waveguide mounting plate, at any one of a plurality of angular orientations relative to the planar exterior surface.

2. The adjustable mounting apparatus of claim 1, wherein the tilting arrangement further includes a third rotation mechanism associated with a third region of the tilting stage.

3. The adjustable mounting apparatus of claim 1, wherein each rotation mechanism includes a rotation screw configured to raise or lower the corresponding region of the tilting stage to effectuate rotation of the tilting stage about the at least two perpendicular axes.

4. The adjustable mounting apparatus of claim 1, wherein each rotation mechanism includes: a turning wheel, a hollow bolt mechanically coupled to the turning wheel, and a rider mechanically coupled to the turning wheel and engaged with the corresponding region of the titling stage, wherein turning of the turning wheel induces turning of the hollow bolt which induces raising or lowering of the rider.

5. The adjustable mounting apparatus of claim 1, further comprising a locking arrangement configured to lock the orientation of the tilting stage at a given angular orientation.

6. The adjustable mounting apparatus of claim 5, wherein the locking arrangement includes a locking mechanism associated with a corresponding one of the rotation mechanisms, wherein the locking mechanism includes a tightening screw configured to engage with a turning wheel of the associated rotation mechanism, wherein rotation of the turning wheel induces raising or lowering of the corresponding region of the tilting stage.

7. The adjustable mounting apparatus of claim 6, wherein the locking mechanism further includes a clamping screw connected to a cable via a cable end that is located on an opposite side of a support member of the plate, wherein tightening of the clamping screw tensions the cable so as to secure the tilting stage to the plate.

8. The adjustable mounting apparatus of claim 7, wherein the locking mechanism further includes a spring located between the cable end and the plate to maintain a residual tension between the cable end and the plate when the clamping screw is loosened.

9. The adjustable mounting apparatus of claim 7, wherein the locking mechanism further includes two or more metallic ends associated with the cable so as to prevent the tilting stage from sinking relative to the plate during tensioning of the cable.

10. The adjustable mounting apparatus of claim 1, wherein the adjustable mounting apparatus is deployed relative to an optical alignment sensor configured to emit one or more collimated beams and receive reflections thereof and a light reflecting apparatus configured to reflect a collimated beam exactly 90 degrees, the adjustable mounting apparatus being deployed relative to the optical alignment sensor and the light reflecting apparatus such that a first collimated light beam is reflected off of a surface that is parallel to the planar exterior surface and a second collimated beam that is perpendicular to the first collimated beam is reflected from a reference surface of the waveguide received by the waveguide mounting plate.

11. The adjustable mounting apparatus of claim 10, wherein the tilting arrangement is configured to align the waveguide received by the waveguide mounting plate within a polishing plate having the planar exterior surface by adjusting the angular orientation of the waveguide such that reflections received by the optical alignment sensor corresponding to the reference surface of the waveguide align within the optical alignment sensor thereby providing an indication of perpendicularity between the reference surface and the planar exterior surface.

12. An apparatus comprising:
    a polishing plate having a flat exterior surface defining a first plane parallel to a polishing plane; and
    at least one adjustable mounting arrangement in communication with the polishing plate, each adjustable mounting arrangement including:
       a titling stage,
       a waveguide mounting plate in communication with the tilting stage and configured to receive a waveguide, and
       a tilting arrangement including a first rotation mechanism associated with a first region of the tilting stage, and a second rotation mechanism associated with a second region of the tilting stage, the rotation mechanisms cooperating to rotate the tilting stage about at least two perpendicular axes so as to position a waveguide, received by the waveguide mounting plate, at any one of a plurality of angular orientations relative to the first plane.

13. The apparatus of claim 12, wherein each rotation mechanism includes a rotation screw configured to raise or lower the corresponding region of the tilting stage to effectuate rotation of the tilting stage about the at least two perpendicular axes.

14. The apparatus of claim 12, wherein each rotation mechanism includes: a turning wheel, a hollow bolt mechanically coupled to the turning wheel, and a rider mechanically coupled to the turning wheel and engaged with the corresponding region of the titling stage, wherein turning of the turning wheel induces turning of the hollow bolt which induces raising or lowering of the rider.

15. The apparatus of claim 12, further comprising a locking arrangement configured to lock an orientation of the tilting stage at a given angular orientation, wherein the locking arrangement includes a locking mechanism associated with a corresponding one of the rotation mechanisms, the locking mechanism including a tightening screw configured to engage with a turning wheel of the corresponding rotation mechanism, wherein rotation of the turning wheel induces raising or lowering of the corresponding region of the tilting stage.

16. The apparatus of claim 15, wherein the locking mechanism further includes a clamping screw connected to a cable via a cable end that is located on an opposite side of a support member of the polishing plate, wherein tightening of the clamping screw tensions the cable so as to secure the tilting stage to the polishing plate.

17. The apparatus of claim 15, wherein the locking mechanism further includes a spring located between the cable end and the polishing plate to maintain a residual tension between the cable end and the polishing plate when the clamping screw is loosened.

18. The apparatus of claim 15, wherein the locking mechanism further includes two or more metallic ends associated with the cable so as to prevent the tilting stage from sinking relative to the polishing plate during tensioning of the cable.

19. The apparatus of claim 12, further comprising:
an optical alignment sensor configured to emit one or more collimated beams and receive reflections thereof; and
a light reflecting apparatus configured to reflect a collimated beam exactly 90 degrees,
wherein the optical alignment sensor and the light reflecting apparatus are deployed relative to the polishing plate such that a first collimated light beam is reflected off of a surface that is parallel to the first plane and a second collimated beam that is perpendicular to the first collimated beam is reflected from a reference surface of the waveguide received by the waveguide mounting plate.

20. The apparatus of claim 19, wherein the at least one adjustable mounting arrangement is configured to align the waveguide received by the waveguide mounting plate within the polishing plate by adjusting the angular orientation of the waveguide such that reflections received by the optical alignment sensor corresponding to the reference surface of the waveguide align within the optical alignment sensor thereby providing an indication of perpendicularity between the reference surface and the first plane.

21. The apparatus of claim 12, further comprising a rotatable base in communication with the polishing plate, the rotatable base operative to bring each adjustable mounting arrangement sequentially into alignment with an optical alignment sensor.

* * * * *